May 6, 1930. C. L. GOHMANN 1,757,664
MEANS FOR JOINING METAL SECTIONS TOGETHER
Filed Dec. 21, 1927 2 Sheets-Sheet 1

INVENTOR.
Charles L. Gohmann
BY James N. Ramsey
ATTORNEY.

May 6, 1930.  C. L. GOHMANN  1,757,664
MEANS FOR JOINING METAL SECTIONS TOGETHER
Filed Dec. 21, 1927  2 Sheets-Sheet 2
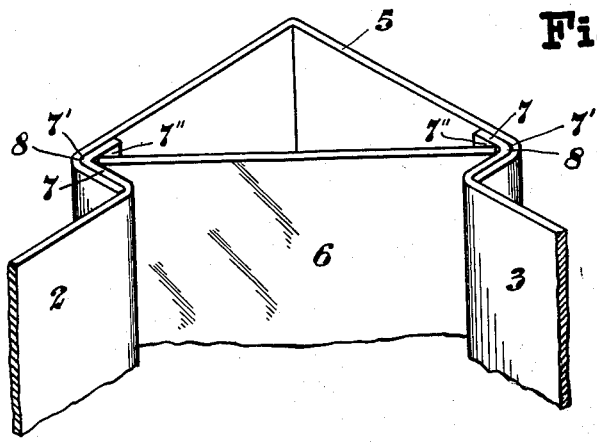
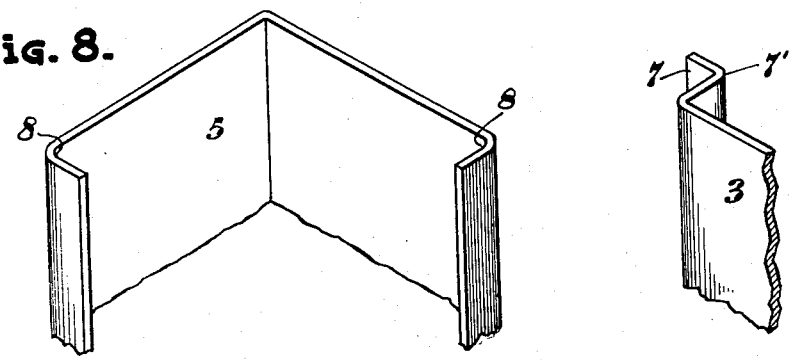
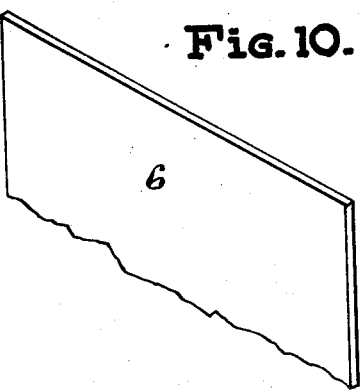
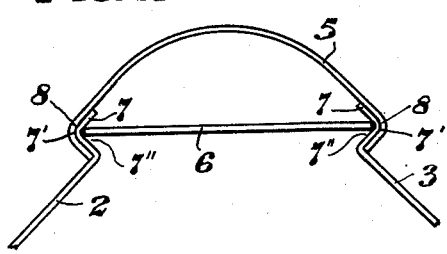
INVENTOR.
Charles L. Gohmann
BY
ATTORNEY.

Patented May 6, 1930

1,757,664

UNITED STATES PATENT OFFICE

CHARLES L. GOHMANN, OF NEW ALBANY, INDIANA, ASSIGNOR TO GOHMANN BROS. AND KAHLER COMPANY, OF NEW ALBANY, INDIANA, A CORPORATION OF INDIANA

MEANS FOR JOINING METAL SECTIONS TOGETHER

Application filed December 21, 1927. Serial No. 241,601.

My invention relates to means for detachably joining together metal sections without the use of bolts and nuts and more particularly to means for detachably binding together metal sections used in the construction of various structures, such as heating stoves, boxes, cabinets, metal furniture, buildings and any other structure where it is desired to join together two or more sections of metal or other suitable material and at different angles of the sections relative to each other.

The object of my invention is to provide simple, efficient, strong, durable, economical, detachable means for quickly, conveniently and readily assembling or disassembling sections of metal or other material for any desired use for which it is adaptable.

A further object of my invention is to provide a structure whereby metal sections can be easily and quickly joined at the corners, as well as between the sections.

My invention consists in providing a flange or corrugated tongue on the edges of the sections to be joined together, forming a ridge on one side of each flange and a groove, or valley, on the other side, said tongues fitting into channels of a retaining member and a binding or locking key or keeper in said grooves snugly fitting between said tongues and securely holding and binding them in rigid and fixed relation with said retaining member.

My invention also consists in the construction, combination, location and arrangements of parts as herein set forth and claimed.

In the drawings:

Fig. 7 is an enlarged isometric view of the corner joint at approximately the rear-center of Fig. 1;

Fig. 8 is a fragmentary isometric view of the connecting member;

Fig. 9 is a fragmentary isometric view of the flange or tongue provided on the edges of the metal sections;

Fig. 10 is a fragmentary isometric view of the binding key; and

Fig. 11 is an enlarged plan view of a modified construction.

Figure 1:
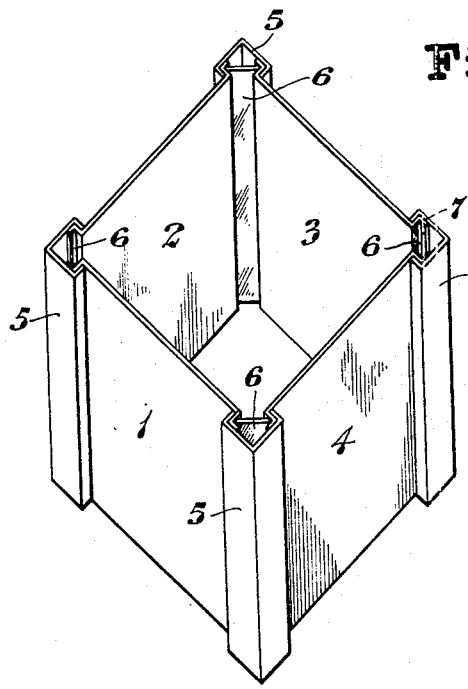
Fig. 1 is an isometric view of a structure made up of metal sections, the corners of which are connected together in accordance with my invention.
Figure 3:
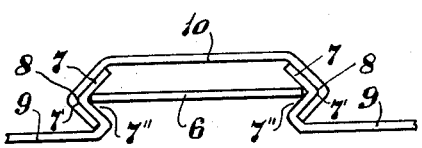
Fig. 3 is a plan view similar to Fig. 2, showing another modified construction.

In the embodiment of my invention as illustrated and which shows a preferred construction I provide a metal structure, as shown in Fig. 1, which comprises four metal sections 1, 2, 3 and 4, respectively, placed in the form of a conventional square, whose corners are to be joined by the use of my invention.

The parts used in accomplishing this purpose consist in retaining members 5, binding key or keeper 6 and flanges or tongues 7 (having ridge 7' on one side and groove or valley 7'' on the other side) said flanges being formed integral with the metal sections 1, 2, 3 and 4, respectively. To assemble the metal sections 1, 2, 3 and 4, respectively, the ridges 7' of flanges or tongues 7 are placed within the channels 8 of retaining members 5 and the binding or locking keys 6 are then inserted in grooves 7'' between the adjacent flanges, thereby securely holding the metal sections 1, 2, 3 and 4, respectively, in rigid relation with the retaining members 5, as will be clearly apparent upon examination of Fig. 1.

Figure 4:
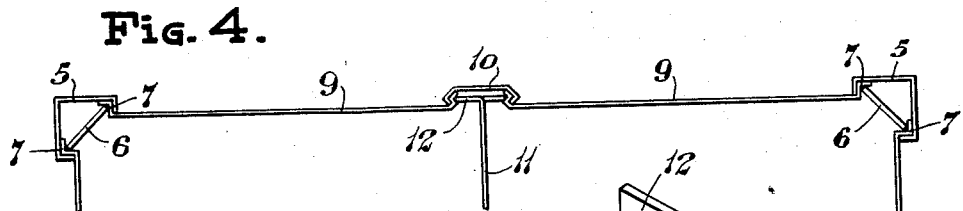
Fig. 4 is a diagrammatic plan view of a plurality of metal sections joined together and embodying my invention.
Figure 6:
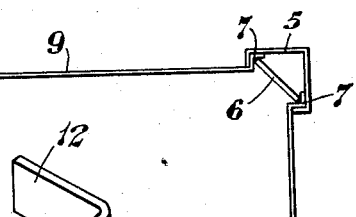
Fig. 6 is a fragmentary view of the partition edge.
Figure 5:
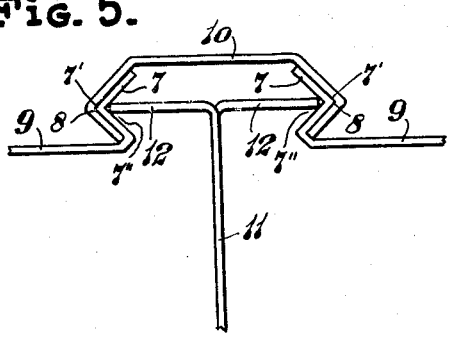
Fig. 5 is an enlarged plan view at approximately the center of Fig. 4 showing the manner in which a partition and two sections may be joined together.

As illustrated, by way of example, in Fig. 4, two or more sections 9 may be joined together by a retaining member 10 and binding key 6. The corners, if there be same, are joined together, as in Fig. 1. If desired, a partition 11 may be inserted between the metal sections 9 and the edge of said partition may be split and bent, as shown in Fig. 6, thereby forming arms 12, which arms may be used in place of the binding key 6 for rigidly securing the metal sections 9 to retaining member 10.

An advantage of this invention is that its construction permits the sections to be compactly housed or placed together for storage and shipment and is so simple that any person can assemble or disassemble the parts.

Another advantage of this invention is that it entirely dispenses with the necessity of drilling or forming bolt holes in the sections and entirely dispenses with the necessity of bolts and nuts for securing the parts together.

When my invention is employed, as for example, on the outer shell or casing of a stove or heater, it has the advantage of forming an air space in the corners which permits said corners to be electroplated or enameled without danger of damage thereto from heat when the stove is in operation, as the lock insulates it therefrom.

The retaining member may be flat, or curved, or corrugated, or any other shape desired.

This invention is also adaptable for use on ventilating pipes, smoke pipes, heating pipes, etc.

Thus it is seen that I provide means of construction whereby metal sections or panels can be easily, conveniently, and quickly assembled or disassembled by unskilled labor; which may be rigidly and firmly secured together to form a stove-casing, box, cabinet, or similar structure, without the use of bolts, nuts, screws, etc.; which is stiff and rigid, yet comparatively light in weight, and requiring only a minimum of material; which is neat and compact in design and is capable of embodiment in a great variety of forms, thereby obtaining the benefit of varying effects, due to differences in shapes; and which, when assembled secures a strong, durable and efficient construction of pleasing and attractive jointure of the parts.

Figure 2:
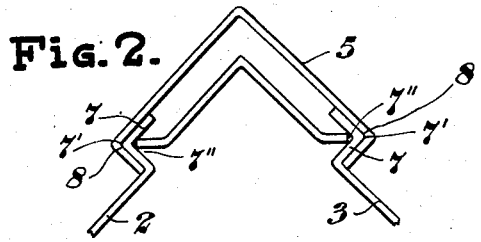
Fig. 2 is an enlarged plan view of a modified construction showing the corner joint at approximately the rear-center of Fig. 1.

It will be understood that certain changes and modifications of my invention may be made without departing from the scope or spirit thereof, as defined in the claim, as for instance, the corner joint, shown in Fig. 1, may be modified, as shown in Fig. 2, thereby providing for increased capacity of the stove, box, or other enclosure, or it may be modified, as shown in Fig. 11 whereby a variation in contour of the corner structure is effected.

What I claim as new and desire to secure by Letters Patent is:

In means of the character described, a pair of spaced apart metal sections each having on its longitudinal edge an outwardly turned flange provided with a V-groove, a retaining member having on each longitudinal edge an inwardly turned flange forming a V-groove and adapted to receive the outwardly turned flanges on said sections, respectively, and a partition having integrally formed spaced apart arms on its edge disposed at right angles thereto and forming a key adapted to frictionally engage the bottoms of said V-grooves in said first-named flanges whereby said sections are detachably held in secure relation with each other and with said partition, substantially as set forth and for the purposes specified.

CHARLES L. GOHMANN.